US008027109B1

(12) United States Patent
Lyman

(10) Patent No.: US 8,027,109 B1
(45) Date of Patent: Sep. 27, 2011

(54) REUSE OF PARTIALLY EXPIRED PHYSICAL TAPE VOLUME

(75) Inventor: Joel Kenneth Lyman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/783,385

(22) Filed: May 19, 2010

(51) Int. Cl.
*G11B 27/02* (2006.01)
*G11B 5/03* (2006.01)
*G11B 15/18* (2006.01)
*G11B 15/48* (2006.01)

(52) U.S. Cl. ........... 360/13; 360/66; 360/72.1; 360/74.1

(58) Field of Classification Search .................. None
See application file for complete search history.

(56) References Cited

U.S. PATENT DOCUMENTS

| 4,520,405 | A | * | 5/1985 | Sasaki et al. .................. 386/287 |
| 4,750,060 | A | * | 6/1988 | Nakazawa et al. ............. 360/66 |
| 5,327,295 | A | * | 7/1994 | Togashi et al. .................. 360/13 |
| 7,620,765 | B1 | | 11/2009 | Ohr et al. .......................... 711/4 |
| 2005/0033755 | A1 | | 2/2005 | Gokhale et al. ............... 707/100 |

* cited by examiner

*Primary Examiner* — Andrew L Sniezek
(74) *Attorney, Agent, or Firm* — John H. Holcombe

(57) ABSTRACT

Reuse of partially expired physical tape volumes reuse is attained in a longitudinal tape data storage drive, wherein data is stored as a sequence of serpentine wraps, a wrap comprising a first linear path traced on a longitudinal tape; and another linear path, laterally spaced from the first linear path, traced on the longitudinal tape; the linear paths extending from one end of the longitudinal tape to the opposite end and arranged in opposite directions. One embodiment of a method comprises identifying expired portions of stored data on the longitudinal tape; determining whether data of a complete linear path of the longitudinal tape has been expired; and allowing reuse of any determined complete linear path for storage of data.

21 Claims, 4 Drawing Sheets

REUSE OF PARTIALLY EXPIRED PHYSICAL TAPE VOLUME

FIELD OF THE INVENTION

This invention relates to longitudinal tape, for example, for magnetic tape cartridges employed in magnetic tape drives, and more particularly to reuse of the longitudinal tape.

BACKGROUND OF THE INVENTION

Longitudinal tape, such as magnetic tape for magnetic tape cartridge volumes, being a serial access media, is typically not subject to reuse until after all of the data stored on the longitudinal tape has been expired. When all of the data has been expired, the physical cartridge volume can be marked as scratch and rewritten.

Data may be stored by magnetic tape as various blocks or sections of data, arranged in a serial string ending with an "end of tape", and also called an "end of data". Subsequent additions of data begin at the previous "end of tape", and continue, ultimately ending with a new "end of tape".

Data that has been stored and subsequently modified is typically not modified in place. Rather, the updated data is stored separately at the end of the string of data and the host system identifies the superseded data as expired.

Thus, blocks or sections of data throughout the serial string of data may be expired. To attempt to reuse the expired blocks or sections would require movement of the tape back and forth to access the reused blocks or sections, resulting in an inefficient use of the tape. Hence, the reuse is not done, and the tape cartridge volume remains with the expired blocks or sections in place until all of the data stored by the tape cartridge volume has been expired, if that ever happens. As a further result, the space efficiency of the tape cartridges is underutilized.

SUMMARY OF THE INVENTION

Methods, data storage controls and longitudinal tape data storage drives provide reuse of partially expired physical tape volumes.

In one embodiment, in a longitudinal tape data storage drive, wherein data is stored as a sequence of serpentine wraps, a wrap comprising a first linear path traced on a longitudinal tape; and another linear path, laterally spaced from the first linear path, traced on the longitudinal tape; the linear paths extending from one end of the longitudinal tape to the opposite end and arranged in opposite directions; a method comprising:

identifying expired portions of stored data on the longitudinal tape;

determining whether data of a complete linear path of the longitudinal tape has been expired; and allowing reuse of any determined complete linear path for storage of data.

In a further embodiment, the allowing step comprises employing a beginning of the complete linear path where lateral translation to the linear path normally occurs, for the allowed reuse to begin.

In a still further embodiment, the determining step comprises determining that at least a complete serpentine wrap has been expired, and the allowing step requires at least one complete serpentine wrap.

In another embodiment, the allowing step comprises allowing the reuse upon an end of data position of another linear path reaching a point wherein the normal lateral translation occurrence is aligned with the beginning of the allowed complete linear path.

Still another embodiment additionally comprises a step of mapping a sequence of lateral repositioning upon completion of tracing linear paths.

In yet another embodiment, wherein the sequence serpentine wraps comprises a sequence of the linear paths wherein an inner linear path is shingled over an adjacent linear path, and wherein the determining step comprises determining whether data of at least two complete adjacent shingled linear paths, one shingled with respect to the other, has been expired.

In another embodiment, the allowing step limits the reuse to exclude reuse of a linear path which is shingled by an adjacent linear path whose data is at least partially unexpired.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
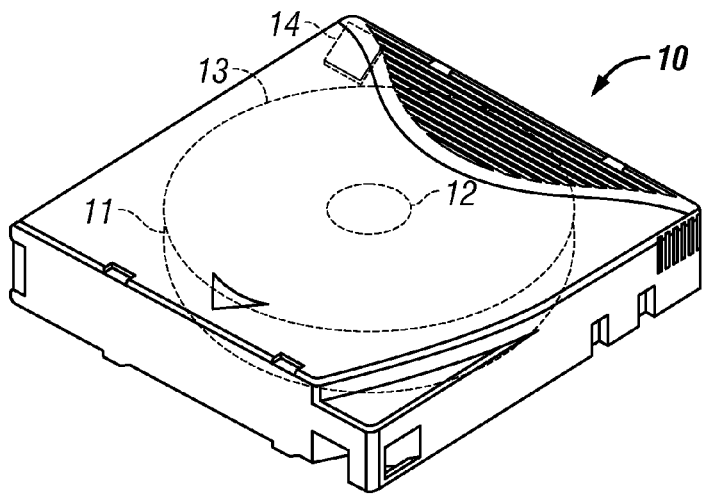
FIG. 1 is an isometric view of a removable data storage cartridge with a longitudinal tape media.

Referring to FIG. 1, an example of a data storage cartridge 10 comprising a longitudinal tape 11, such as magnetic tape, is illustrated wherein the rewritable magnetic tape 11 is wound on a hub 12 of reel 13. A cartridge memory 14 may store information regarding the data storage cartridge and, for example, comprises a transponder having a contactless interface. The illustrated magnetic tape cartridge is a single reel cartridge. Magnetic tape cartridges may also comprise dual reel cartridges in which the tape is fed between reels of the cartridge.

Figure 2:
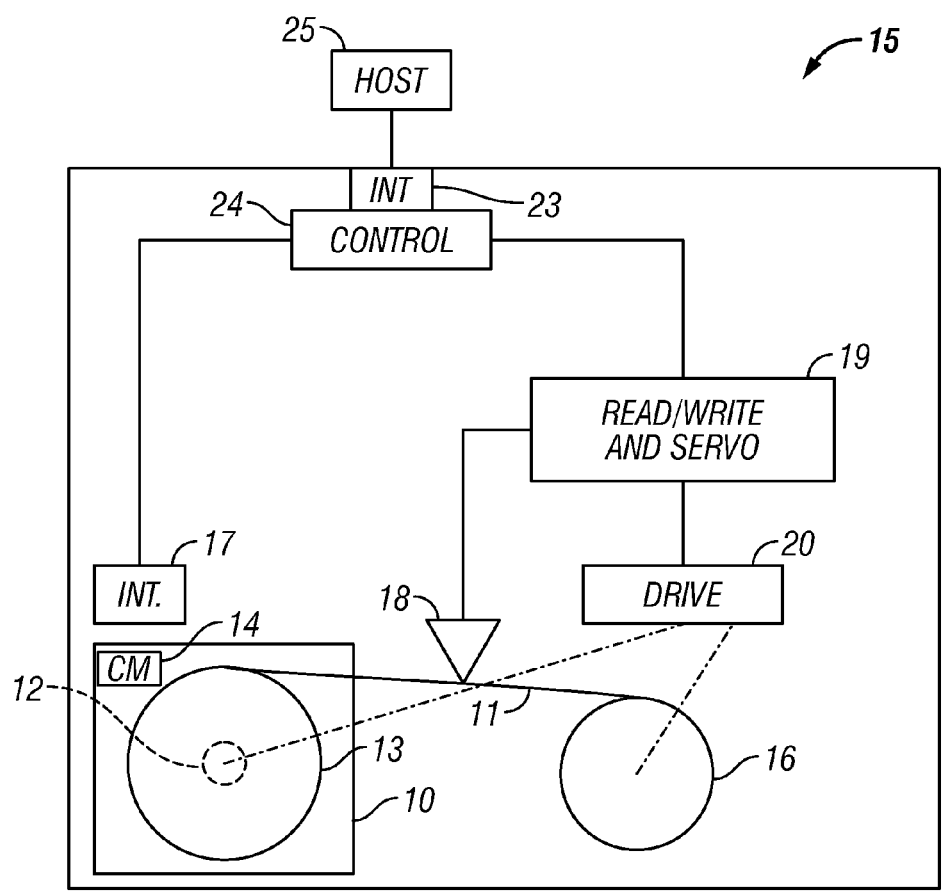
FIG. 2 is a block diagrammatic representation of a data storage drive for handling the removable data storage cartridge of FIG. 1, and which may implement the present invention.

Referring to FIG. 2, a magnetic tape drive 15 is illustrated. An example of a magnetic tape drive is the IBM® LTO (Linear Tape Open) magnetic tape drive 15, with microcode, etc., to perform desired operations with respect to the magnetic tape cartridge 10. Another example of a magnetic tape drive is the IBM® TotalStorage Enterprise magnetic tape drive. Both the above examples of magnetic tape drives employ single reel tape cartridges 10. An alternative magnetic tape drive and magnetic tape cartridge is a dual reel cartridge and drive in which both reels 13 and 16 are contained in the cartridge. In the instant example, the magnetic tape 11 is wound on a reel 13 in the cartridge 10, and, when loaded in the magnetic tape drive 15, is fed between the cartridge reel and a take up reel 16 in the magnetic tape drive. Alternatively, both reels of a dual reel cartridge are driven to feed the magnetic tape between the reels.

The magnetic tape drive comprises a memory interface 17 for reading information from, and writing information to, the cartridge memory 14 of the magnetic tape cartridge 10. A read/write system is provided for reading and writing information to the magnetic tape, and, for example, may comprise a read/write and servo head system 18 with a servo system for moving the head laterally of the magnetic tape 11, a read/write servo control 19, and a drive motor system 20 which moves the magnetic tape 11 between the cartridge reel 13 and the take up reel 16 and across the read/write and servo head system 18. The read/write and servo control 19 controls the operation of the drive motor system 20 to move the magnetic tape 11 across the read/write and servo head system 18 at a desired velocity, and, in one example, determines the lateral location of the read/write and servo head system with respect to the magnetic tape 11, and, in another example, determines the longitudinal position of the tape 11 by reading the tape servo tracks. In one example, the read/write and servo head system 18 and read/write and servo control 19 employ servo signals on the magnetic tape 11 to determine the location of the read/write and servo head system, and in another example, the read/write and servo control 19 employs at least one of the reels, such as by means of a tachometer, to determine the location of the read/write and servo head system with respect to the magnetic tape 11. The read/write and servo head system 18 and read/write and servo control 19 may comprise hardware elements and may comprise any suitable form of logic, including a processor operated by software, or microcode, or firmware, or may comprise hardware logic, or a combination.

An interface 23 provides communication with respect to one or more host systems or processors 25, and is configured to receive and to send information externally of the data storage drive. Alternatively, the magnetic tape drive 15 may form part of a subsystem, such as a library, and may also receive commands from the subsystem, also at interface 23.

A control 24 communicates with the host interface 23, with memory interface 17, and communicates with the read/write system, e.g., at read/write and servo control 19. The control 24 may comprise any suitable form of logic, including one or more processors operated by software, or microcode, or firmware, or may comprise hardware logic, or a combination.

The illustrated and alternative embodiments of magnetic tape drives are known to those of skill in the art, including those which employ dual reel cartridges.

Other types of removable data storage cartridges and data storage drives are known to those of skill in the art. Examples comprise optical disk cartridges and drives, optical tape cartridges and drives, removable computer diskettes and drives, rigid magnetic disk cartridges and drives, etc.

The control 24 typically communicates with the one or more host systems 25 or subsystems via interface 23, and operates the magnetic tape drive 15 in accordance with commands originating at the host or subsystem.

As illustrated, the magnetic tape drive 15 provides information to the magnetic tape 11 of the magnetic tape cartridge 10. The magnetic tape is a serial data storage means where the data may be stored as various blocks or sections of data, arranged in a serial string.

Figure 3:
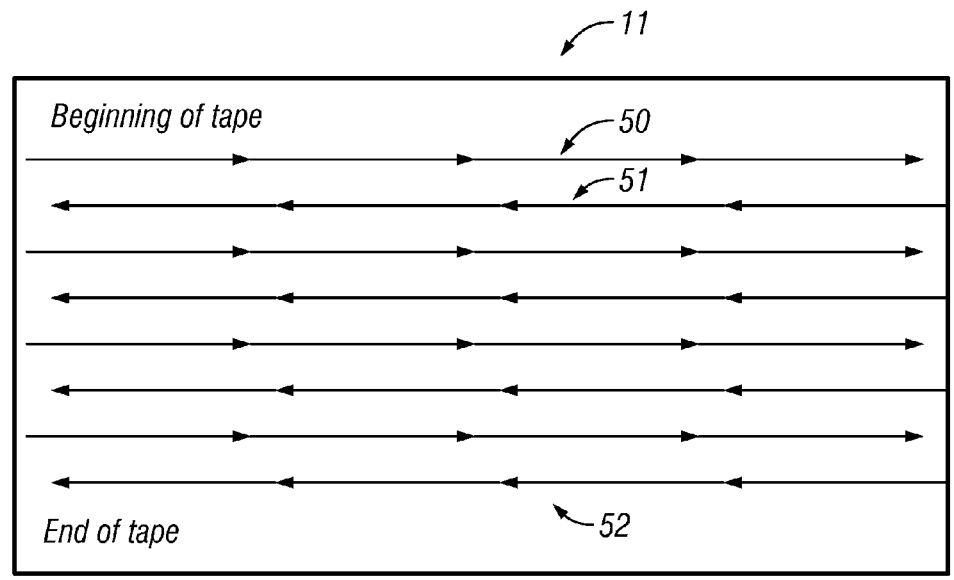
FIG. 3 is a diagrammatic representation of information provided on a longitudinal tape.

Referring to FIG. 3, a magnetic tape 11 is illustrated with several parallel wraps of groups of parallel tracks. In the example, the magnetic tape is moved longitudinally in a first direction from the leading end of the tape while the head system reads and/or writes data with respect to one linear path of the wrap, and is reversed at the other end of the tape to be moved in the opposite direction and the head system is shifted to another linear path of the wrap, and the paths are termed "serpentine" paths. In the illustration, only one path is shown for each wrap, whereas in a physical tape a number of read and write elements are arranged to trace parallel paths within the linear path.

Figure 5:
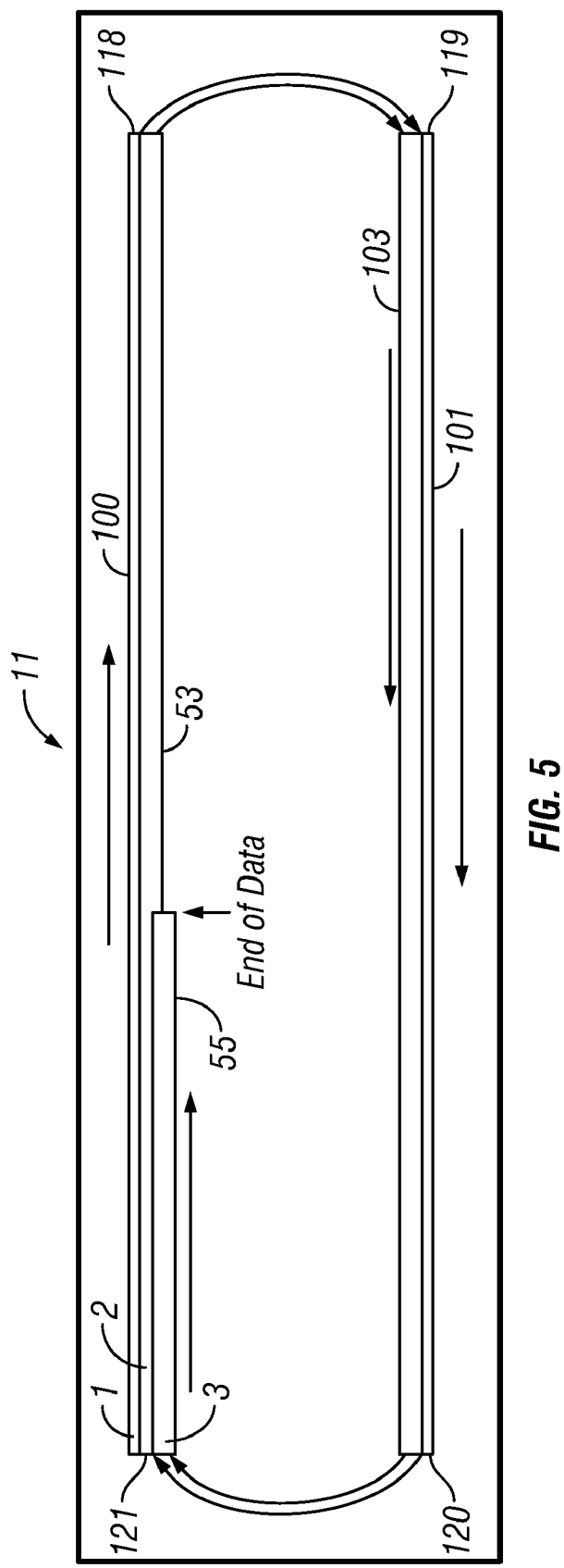
FIG. 5 is a diagrammatic representation of an alternative arrangement of information provided on a longitudinal tape.

The serpentine paths may be arranged in at least two patterns. In FIG. 3, in one pattern, a wrap comprises laterally offset adjacent linear paths 50 and 51. In another pattern, the wraps are arranged in an inward spiral so that a wrap comprises laterally offset paths 50 and 52. The wrap comprising adjacent linear paths 50 and 51 has the advantage of the paths being closer together, reducing the time to translate between the paths at the ends of the tape. The wrap comprising an inward spiral of linear paths 50 and 52 is typically used when adjacent linear paths are "shingled" as shown in FIG. 5. Shingling is employed to increase the number of tracks that can be recorded without reducing the size of the tape write elements. As can be seen in FIG. 5, track 55 partially overwrites track 53. Again, a single linear path is illustrated, while the individual write elements shingle each of the parallel paths making up the linear path.

The end of the string of data may be called the "end of data" and may also be called the "end of tape". Subsequent additions of data begin at the previous "end of tape", and continue, ultimately ending with a new "end of tape".

Data that has been stored and subsequently modified is typically not modified in place. Rather, typically, the updated data is stored separately at the end of the string of data and the host system identifies the superseded data as expired.

Figure 4:
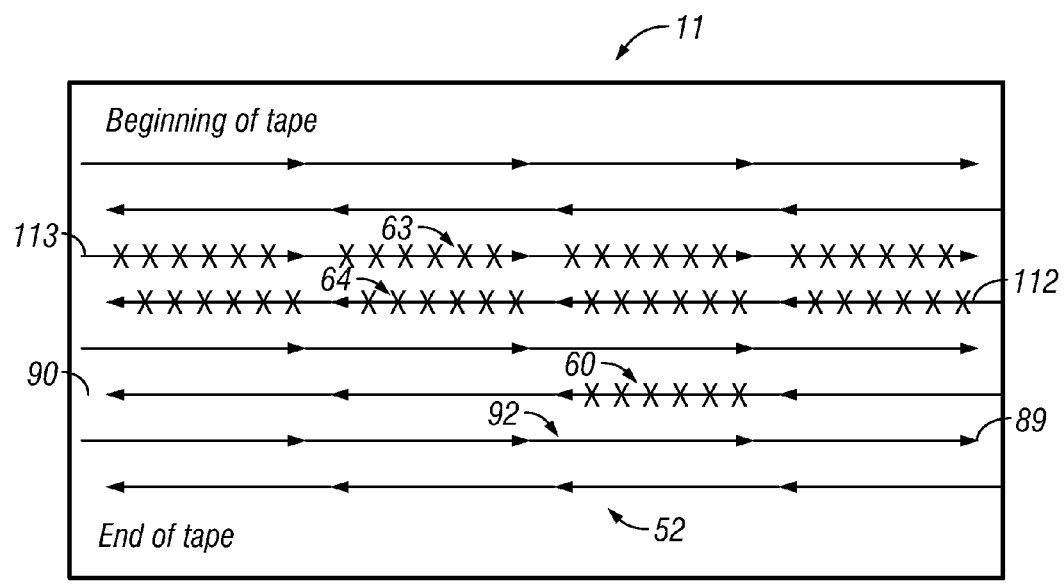
FIG. 4 is a diagrammatic representation of changes to the information of FIG. 3.

Referring to FIGS. 2 and 4, a block 60 of data has been marked as expired by a host (as shown by the "X"s). In accordance with the present invention, the control 24 identifies expired portions of the data stored on the tape 11. The control further determines whether data of a complete linear path 63 of the longitudinal tape has been expired; and allows reuse of any determined complete linear path 63 for storage of data. Alternatively, the determination may be of expiration of a complete wrap 63, 64 and the control 24 allows reuse of the determined complete wrap.

The lateral translation between paths normally occurs at each end of the physical tape. When the end of tape or end of data reaches an end of the physical tape, the control 24 operates the read/write and servo 19 to translate the head 18 laterally to the next path in the sequence. In accordance with the present invention, the control, in allowing the reuse of a complete linear path or a complete wrap, when the end of tape or end of data reaches an end of the physical tape, similarly operates the read/write and servo to translate the head 18 laterally, but not to the next linear path in the sequence, but instead back to the complete linear path or wrap that has been determined to have been expired, thereby reusing the linear path or wrap.

Figure 6:
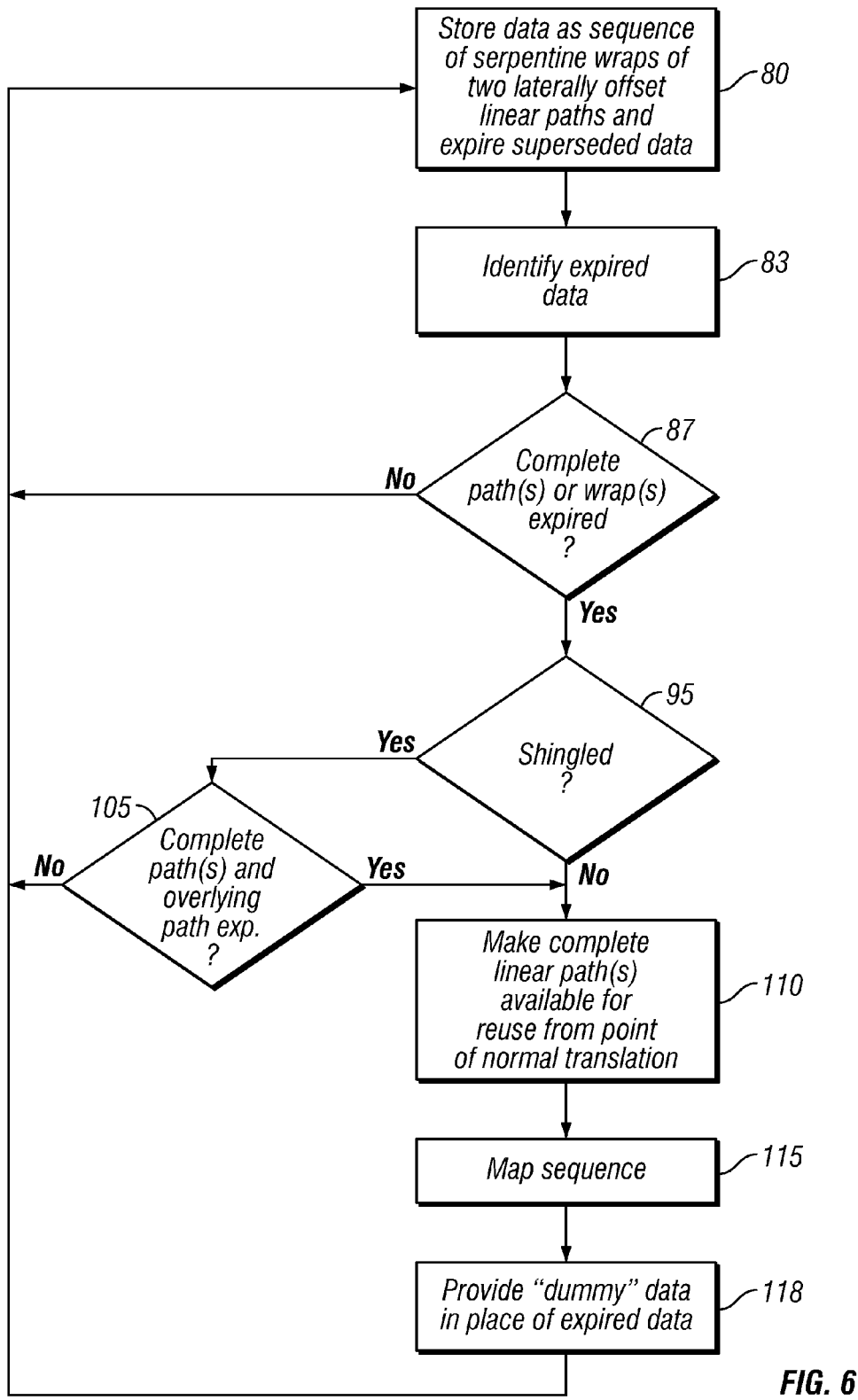
FIG. 6 is a flow chart depicting an exemplary method of operating the data storage drive of FIG. 2.

Referring additionally to FIG. 6, in step 80, the control 24 operates the longitudinal tape data storage drive 15 to store data received from a host or hosts 25 as directed by the host(s), storing the data as a sequence of serpentine wraps of two laterally offset linear paths on longitudinal tape 11. The host (s) may also update the data or indicate that the data is no longer needed, and the updated data is stored in the continuing sequence of serpentine wraps, while the superseded and unneeded data is expired by the host(s).

In step 83, the control identifies the expired data 60, 63, 64, storing the identification, for example, in memory. The control prevents reuse of small segments of free space represented by the small expired blocks 60 thereby avoiding a performance impact that would be incurred due to the linear tape motion associated with finding an empty segment. Although one of the key functions that is typical of an enterprise class tape drive is the ability to do a high speed locate operation to the beginning of the expired data, doing so for a large number of small segments causes a performance impact.

In step 87, the control 24 determines whether data of a complete linear path 63 or 64 of the longitudinal tape has been expired. A complete linear path allows translation to the linear path in a similar manner as a normal translation to continue the sequence of serpentine paths. Thus, if the end of tape or end of data was positioned at the physical end of tape position 89, the normal translation would be laterally to path 52 and is instead made in the opposite direction to path 64.

Alternatively, the user may prefer to operate only with wraps, and in that case, the control 24, in step 87, determines whether data of a complete wrap 63, 64 of the longitudinal tape has been expired. A complete wrap allows translation to the linear path in a similar manner as a normal translation to continue the sequence of serpentine wraps. Thus, if the end of tape or end of data was positioned at the physical end of tape position 90, the normal translation would be laterally to path 92 and is instead made in the opposite direction to path 63.

Referring additionally to FIG. 5, if the linear paths are shingled, as are paths 1, 2, 3, a different scenario is conducted. Step 95 determines whether the linear paths are shingled, a determination that may be made by accessing the cartridge memory 14 where an indication is stored, as is known in the art. In the event that the longitudinal tape comprises shingled data, not only must a complete path 100 or 101, or wrap 100, 101 be determined to be expired in step 87, but in step 105, the complete path 53 or 103 or wrap 53, 103 overlying the complete path 100 or 101, or wrap 100, 101 must also be determined to be expired. This is because to overwrite the complete path 100 or 101, or wrap 100, 101 would destroy the overlying complete path 53 or 103 or wrap 53, 103.

If either step 87 or step 105 indicates insufficient data has been expired, the process returns to step 80 to continue to store and expire data.

If step 87 indicates that sufficient data has been expired to comprise a complete linear path or wrap and, if not shingled, step 110 allows the complete linear path 63 or 64 to be available for reuse, or alternatively, allows the complete wrap 63, 64 to be available for reuse.

If step 95 indicates that the linear paths are shingled, and step 87 indicates that sufficient data has been expired to comprise a complete linear path or wrap, and step 105 additionally indicates that the complete path 53 or 103 or wrap 53, 103 overlying the complete path 100 or 101, or wrap 100, 101 has been determined to be expired, step 110 allows the complete linear path 100 or 101, or wrap 100, 101 to be available for reuse, limiting the reuse to exclude reuse of a linear path which is shingled by an adjacent linear path whose data is at least partially unexpired.

The allowing step 110 makes the complete linear path(s) available for reuse from the beginning of the complete linear path where lateral translation to the linear path normally occurs, such as at point 112 for linear path 64. If a serpentine wrap is expired and available, the allowing step 110 makes the complete linear path(s) available for reuse from the beginning of the complete wrap where lateral translation to the first linear path of the wrap normally occurs, such as at point 113 for linear path 63.

In another way of stating the requirement, the allowing step comprises allowing the reuse upon an end of data position of another linear path reaching a point wherein the normal lateral translation occurrence is aligned with the beginning of the allowed complete linear path. Thus, allowing step 110 makes the complete linear path(s) available for reuse from the end of the complete linear path where lateral translation to another linear path normally occurs, such as at point 89 for linear path 92. The translation becomes a lateral translation to point 112 for linear path 64 rather than to linear path 52. Similarly, if the allowing step is to a complete wrap for reuse, allowing step 110 makes the complete wrap(s) available for reuse from the beginning of the first complete linear path of the wrap where lateral translation to the wrap normally occurs, such as at point 113 for linear path 63 rather than to linear path 92.

The same holds true for shingled paths in that the allowing step 110 makes the complete linear paths available for reuse from the end of the complete linear path where lateral translation to another linear path normally occurs, such as from point 118 of linear path 100 to a point 119 for linear path 101. Similarly, if the allowing step is to a complete wrap for reuse, allowing step 110 makes the complete wrap(s) available for reuse from the beginning of the first complete linear path of the wrap where lateral translation to the wrap normally occurs, such as at point 120 from linear path 53 to point 121 of linear path 53.

In step 115, the control 24 maps the sequence of lateral repositioning upon completion of tracing the linear paths. The mapping indicates the new sequence of the lateral positions after reuse.

The present invention is of importance if the host(s) is writing multiple backups on a single volume. As old backups expire, large contiguous sections of the tape can be reclaimed.

When data has been expired and reuse allowed of a complete linear path or complete wrap and a host has overwritten the expired data, a host may attempt to access the expired data. For example, if in FIG. 4, assume linear paths 63 and 64 contain logical blocks 2000 through 3999. Then assume the complete linear paths 63 and 64 are expired, made available for reuse, and then overwritten with logical blocks 8000 through 9999.

Referring to FIG. 6, if the host(s) attempt to read any of the expired and overwritten data blocks 2000 through 3999 at a later time, in step 118, the control instead returns "dummy" data blocks. An example of "dummy" data is a 1 kb X"00" pattern. In the specific example, if a host application attempts to read any logical block in the range 2000 to 3999, "dummy" data is returned until the host reaches block 4000 (which is located at the beginning of the linear path following path 64).

Thus, the control ensures that unexpired data on the tape is always found at the same logical block offset independent of linear paths that may have been overwritten.

The implementations may involve software, firmware, micro-code, hardware and/or any combination thereof. The implementation may take the form of code or logic implemented in a medium, such as memory, storage and/or circuitry of control 24 where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a longitudinal tape data storage drive, wherein data is stored as a sequence of serpentine wraps, a wrap comprising a first linear path traced on a longitudinal tape; and another linear path, laterally spaced from said first linear path, traced on said longitudinal tape; said linear paths extending from one end of said longitudinal tape to the opposite end and arranged in opposite directions; a method comprising:
   identifying expired portions of stored data on said longitudinal tape;
   determining whether data of a complete linear path of said longitudinal tape has been expired; and
   allowing reuse of any said determined complete linear path for storage of data.

2. The method of claim 1, wherein said allowing step comprises employing a beginning of said complete linear path where lateral translation to said linear path normally occurs, for said allowed reuse to begin.

3. The method of claim 2, wherein said determining step comprises determining that at least a complete said serpentine wrap has been expired, and said allowing step requires at least one complete said serpentine wrap.

4. The method of claim 2, wherein said allowing step comprises allowing said reuse upon an end of data position of another linear path reaching a point wherein said normal lateral translation occurrence is aligned with said beginning of said allowed complete linear path.

5. The method of claim 2, additionally comprising a step of mapping a sequence of lateral repositioning upon completion of tracing linear paths.

6. The method of claim 2, wherein said sequence serpentine wraps comprises a sequence of said linear paths wherein an inner said linear path is shingled over an adjacent said linear path, and wherein said determining step comprises determining whether data of at least two complete adjacent shingled linear paths, one shingled with respect to the other, has been expired.

7. The method of claim 6, wherein said allowing step limits said reuse to exclude reuse of a said linear path which is shingled by an adjacent said linear path whose data is at least partially unexpired.

8. A data storage control configured for a longitudinal tape data storage drive, said longitudinal tape data storage drive configured for storing data on longitudinal tape as a sequence of serpentine wraps, a wrap comprising a first linear path traced on a longitudinal tape; and another linear path, laterally spaced from said first linear path, traced on said longitudinal tape; said linear paths extending from one end of said longitudinal tape to the opposite end and arranged in opposite directions; comprising:
   at least one processor configured to cause said longitudinal tape data storage drive to perform operations; and
   at least one memory coupled to said at least one processor, wherein said at least one memory comprises program instructions executable by said at least one processor to configure said at least one processor to:
      identify expired portions of stored data on said longitudinal tape;
      determine whether data of a complete linear path of said longitudinal tape has been expired; and
      allow reuse of any said determined complete linear path for storage of data.

9. The data storage control of claim 8, wherein said processor is further configured to, in said reuse allowance, to employ a beginning of said complete linear path where lateral translation to said linear path normally occurs, for said allowed reuse to begin.

10. The data storage control of claim 9, wherein said processor is further configured to, in said data determination, to determine that at least a complete said serpentine wrap has been expired, and, in said allowing step, require said allowing step to comprise at least one complete said serpentine wrap.

11. The data storage control of claim 9, wherein said processor is further configured to, in said reuse allowance, to allow said reuse upon an end of data position of another linear path reaching a point wherein said normal lateral translation occurrence is aligned with said beginning of said allowed complete linear path.

12. The data storage control of claim 9, wherein said processor is additionally configured to map a sequence of lateral repositioning for tracing linear paths.

13. The data storage control of claim 9, wherein said sequence serpentine wraps comprises a sequence of said linear paths wherein an inner said linear path is shingled over an adjacent said linear path, and wherein said processor is further configured to, in said data determination, to determine whether data of at least two complete adjacent shingled linear paths, one shingled with respect to the other, has been expired.

14. The data storage control of claim 13, wherein said processor is further configured to, in said reuse allowance, to limit said reuse to exclude reuse of a linear path which is shingled by an adjacent said linear path whose data is at least partially unexpired.

15. A longitudinal tape data storage drive, comprising:
   a read/write system configured to record and read data on a longitudinal tape data storage medium;
   a drive configured to move said longitudinal tape data storage medium in the longitudinal direction with respect to said head;
   a servo system configured to position a head laterally with respect to said longitudinal tape; and
   a storage control configured for operating said longitudinal tape data storage drive to:
      store data on longitudinal tape as a sequence of serpentine wraps, a wrap comprising a first linear path traced on a longitudinal tape; and another linear path, laterally spaced from said first linear path, traced on said longitudinal tape; said linear paths extending from one end of said longitudinal tape to the opposite end and arranged in opposite directions;
      identify expired portions of stored data on said longitudinal tape;
      determine whether data of a complete linear path of said longitudinal tape has been expired; and
      allow reuse of any said determined complete linear path for storage of data.

16. The longitudinal tape data storage drive of claim 15, wherein said storage control is further configured to, in said reuse allowance, to employ a beginning of said complete linear path where lateral translation to said linear path normally occurs, for said allowed reuse to begin.

17. The longitudinal tape data storage drive of claim 16, wherein said storage control is further configured to, in said data determination, to determine that at least a complete said serpentine wrap has been expired, and, in said reuse allowance, require said reuse allowance to comprise at least one complete said serpentine wrap.

18. The longitudinal tape data storage drive of claim 17, wherein said processor is further configured to, in said reuse allowance, to allow said reuse upon an end of data position of another linear path reaching a point wherein said normal lateral translation occurrence is aligned with said beginning of said allowed complete linear path.

19. The longitudinal tape data storage drive of claim 16, wherein said sequence serpentine wraps comprises a sequence of said linear paths wherein an inner said linear path is shingled over an adjacent said linear path, and wherein said storage control is further configured to, in said data determination, to determine whether data of at least two complete adjacent shingled linear paths, one shingled with respect to the other, has been expired.

20. The longitudinal tape data storage drive of claim 19, wherein said storage control is further configured to, in said reuse allowance, to limit said reuse to exclude reuse of a linear path which is shingled by an adjacent said linear path whose data is at least partially unexpired.

21. The longitudinal tape data storage drive of claim 15, wherein said storage control is additional configured to respond to an attempt to read any of expired data whose reuse has been allowed and which has been overwritten, by returning "dummy" data therefor.

* * * * *